455-613 AU 233 EX

FIP8106 XR 3,555,283

233

United States Patent [11] 3,555,283

[72] Inventors Hermann Georg Grimmeiss
Aachen;
Peter Johannes Philippus Gerardus Simons,
Emmasingel Eindhoven, Netherlands

[21] Appl. No. 434,787
[22] Filed Feb. 24, 1965
[45] Patented Jan. 12, 1971
[73] Assignee U. S. Philips Corporation
New York, N.Y.
a corporation of Delaware. by mesne assignments H 2-12-64 due

[54] SOLID STATE LIGHT EMITTING DIODE WHEREIN OUTPUT IS CONTROLLED BY CONTROLLING ELECTION POPULATION OF AN INTERMEDIATE LEVEL WITH AN AUXILIARY LIGHT SOURCE
5 Claims, 10 Drawing Figs.

[52] U.S. Cl. 250/217, 250/199, 250/211, 317/235
[51] Int. Cl. H01l 15/06
[50] Field of Search 250/211J, 217SSL, 199; 317/235.27; 332/7.5; 307/312

[56] References Cited
UNITED STATES PATENTS

| | | | |
|---|---|---|---|
| 3,070,698 | 12/1962 | Bloenbergen | 250/83.3 |
| 3,171,031 | 2/1965 | Yariv | 250/199 |
| 3,229,104 | 1/1966 | Ratz | 250/211 |
| 3,304,430 | 2/1967 | Biard et al. | 250/211 |
| 3,245,002 | 4/1966 | Hall | 317/235 |
| 3,333,101 | 7/1967 | Bell | 250/83.3 |

*Primary Examiner*—Archie R. Borchelt
*Assistant Examiner*—Martin Abramson
*Attorney*—Frank R. Trifari

ABSTRACT: A controllable injection recombination radiation or light source comprising a semiconductor having an intermediate level in its forbidden gap is described. The output radiation is controlled or modulated by controlling or modulating the electron population of the intermediate level using an auxiliary source of radiation to irradiate the semiconductor.

INVENTOR.
HERMANN G. GRIMMEISS
PETER J.P.G. SIMONS
BY Frank R. Trifari
AGENT

INVENTOR.
HERMANN G. GRIMMEISS
PETER J.P.C. SIMONS

AGENT

SOLID STATE LIGHT EMITTING DIODE WHEREIN OUTPUT IS CONTROLLED BY CONTROLLING ELECTION POPULATION OF AN INTERMEDIATE LEVEL WITH AN AUXILIARY LIGHT SOURCE

The invention relates to a semiconductor arrangement with a controlled injection recombination radiation source comprising a semiconductor body.

In the semiconductor body of an injection recombination radiation source radiation is produced by injection of charge carriers, which results in recombination of electrons and holes with the emission of radiation. The injection of charge carriers is obtained by passing an electric current through the semiconductor body. The semiconductor body usually contains a PN-junction so that by the passage of current in the forward direction through the PN-junction electrons are injected into the P-type portion of the semiconductor body and/or holes are injected into the N-type portion of the semiconductor body. The intensity of the radiation emitted depends upon the value of the current passed through the semiconductor body.

A controlled injection recombination radiation source may be used for the optical transmission of signals. For this purpose, a supply current source is connected to the radiation source and a supply current is sent through the radiation source passing this source into the radiating condition. The emitted radiation must be modulated for the transmission of signals. The modulated radiation may be detected with the aid of a photodetector and converted into electric signals.

Modulation of the emitted radiation may be obtained by modulating the supply current passing through the injection recombination radiation source by means of an electric signal source. In many cases, however, this method of modulation is unsuitable. From the point of view of electrical circuitry, for example, in transmitting weak signals it may be unprofitable for these weak signals to be applied to the radiation source by modulation of a large supply current. Also, in many cases it is desirable to avoid electric coupling between the signal source and the supply current source. Moreover, for some uses it may be useful for the injection recombination radiation source to be remotely controlled without electric connections.

Another possible method of modulation is to modulate the radiation emitted by the injection recombination radiation source externally of this source by passing it through a separate modulator. In practice, however, it is generally found that such methods of modulation are less efficient than the aforementioned method.

Control of an injection recombination radiation source is also found in optoelectronic circuit elements comprising an injection recombination radiation source to which the electric input of the circuit element is connected and which is optically coupled to a photosensitive semiconductor body to which the electric output of the circuit element is connected. In these optoelectronic circuit elements also it is frequently inconvenient that a supply current and electric input signals have to be supplied to the same electric input of the circuit element.

It is an object of the invention to provide a semiconductor arrangement with a controlled injection recombination radiation source which is of a completely novel type and enables the aforementioned disadvantages to be avoided.

According to the invention a semiconductor arrangement with a controlled injection recombination radiation source comprising a semiconductor body is characterized in that the radiative recombination of electrons and holes in the semiconductor body occurring due to the injection of charge carriers is controlled by controlling the electron population of an intermediate level, which is situated in the forbidden band between the valence band and the conduction band of the semiconductor body, with the aid of a controlling radiation source which is optically coupled to the controlled radiation source and emits radiation enabling electrons in the semiconductor body to be brought to a higher energy state.

In a semiconductor arrangement according to the invention the input signals may be supplied to the controlling radiation source separately from the supply current supplied to the controlled radiation source and, if desired, electric coupling between an electric signal source connected to the controlling radiation source and a supply current source connected to the controlled radiation source may be avoided. Moreover, the radiation sources may be spaced from one another, the controlled radiation source being remotely controlled with the aid of the controlling radiation source.

The controlling radiation source may be any radiation source which emits radiation having the desired wavelength, for example, a tungsten ribbon lamp provided with a monochromator, for example, an interference filter. However, the controlling radiation source preferably is an injection recombination radiation source, which permits an increased simplicity and compactness of a constructural combination of the two radiation sources. (Such a constructural combination is frequently desirable).

An important embodiment of a semiconductor arrangement according to the invention is is characterized in that the electron population of the intermediate level is controllable by reason of the fact that the radiation emitted by the controlling radiation source is capable of bringing electrons from the valence band to the intermediate level while the radiative recombination is effected by way of this intermediate level and can be inhibited by increasing said population. It may be clear that when the intermediate level already is entirely or partly occupied by electrons, electrons from the conduction band can hardly or not at all attain the valence band via this intermediate level and recombine with holes in the valence band.

Satisfactory results have been achieved with a controlled injection recombination source having a semiconductor body of gallium phosphide which, at least in the proximity of the PN-junction, is doped with zinc and oxygen in order to produce the desired intermediate level. Gallium phosphide has a width of the forbidden band of about 2.25 electron volts, and the intermediate level produced by zinc and oxygen in the forbidden band is spaced from the valence band by a distance of about 0.45 electron volt and from the conduction band by a distance of about 1.8 electron volts. In this case the recombination radiation has a wavelength of about 7000 A.U., which corresponds to a quantum energy of about 1.8 electron volts. In this case the controlling radiation source must emit radiation having a quantum energy which is at least equal to 0.45 electron volt but which is smaller than the quantum energy of the recombination radiation (1.8 electron volts). Thus, the controlling radiation source may be, for example, an injection recombination radiation source which includes a gallium arsenide or an indium phosphide body and is capable of emitting radiation having a wavelength of about 9100 A. (which corresponds to a quantum energy of about 1.36 electron volts).

A further important embodiment of a semiconductor arrangement according to the invention is characterized in that the intermediate level allows radiationless recombination of electrons and holes so that, at least over part of the current range of the controlled radiation source, radiative recombination is restricted while the radiationless recombination and hence the said restriction may be controlled by controlling the electron population of the intermediate level.

The radiationless recombination by way of the intermediate level may be restricted or prevented, for example, by using a controlling radiation source which emits radiation capable of bringing electrons from the intermediate level to the conduction band. In this case electrons which attain the intermediate level from the conduction band are not one and all lost for radiative recombination, since at least part of the electrons are returned to the conduction band by the radiation emitted by the controlling radiation source and still stand a chance of recombining with holes with the emission of radiation. Thus, in this method the possible electron population of the intermediate level is restricted.

Alternatively, the radiationless recombination by way of the intermediate level may also be controlled in a manner similar to that in which in the preceding embodiment the recombination with the emission of radiation is controlled, that is to say, by controlling the electron population of the intermediate level by bringing electrons from the valence band to the intermediate level, thus more or less effectively blocking the way for electrons in the conduction band which otherwise are likely to reach the valence band by way of this intermediate level. In this method the radiation emitted by the controlling radiation source must have a quantum energy which corresponds at least to the energy required to bring an electron from the valence band to the intermediate level.

Consequently, in this alternative embodiment the recombination with the emission of radiation is not effected by way of said intermediate level but by way of another intermediate level or, for example, by band-to-band transitions.

A semiconductor body may contain in the forbidden band an intermediate level which allows radiationless recombination by reason of the fact that radiationless recombination centers, which are frequently referred to as "killers" in the literature, are incorporated in the semiconductor body. As is usual, the term "radiationless recombination center" is to be understood to mean a center by way of which recombination can occur without the emission of radiation, that is to say, at least without the emission of radiation having the wavelength or wavelengths effective for the optoelectronic arrangement, while this recombination generally takes place under delivery of thermal energy to the crystal lattice.

Those radiationless recombination centers are particularly suitable of which the capture cross section for the charge carriers injected for the purpose of recombination is greater than that of the "radiating" recombination centers and also is greater, for example 100 times greater, than the capture cross section, after an injected charge carrier has been taken up on the radiationless recombination center, for the charge carriers of opposite type. As is known, such radiationless recombination centers may be constituted in a semiconductor body by crystal defects or by certain impurities, generally transition elements, such as iron and cobalt.

With an increasing current passing through such an injection recombination radiation source comprising such radiationless recombination centers, the radiation intensity increases in superlinear relationship to the current strength through the radiation source over that part of the current range of the radiation source in which the number of injected charge carriers assumes a value at which the radiationless recombination centers become saturated. With small currents through the radiation source recombination occurs substantially only via the radiationless recombination centers so that the intensity of the emitted radiation is very small, at greater current strengths the intensity of the emitted radiation increases in superlinear relationship to the current strength while saturation of the radiationless recombination centers occurs. If saturation of the ratiationless recombination centers is reached, the intensity of the emitted radiation increases at a lesser rate, for example, in linear relationship to the current strength.

The current range of the controlled injection recombination radiation source in which the intensity of the emitted radiation increases in superlinear relationship to the current strength can be shifted, by controlling the electron population of the intermediate level, to smaller or again to greater current strengths, with the consequent possibility that the intensity of the emitted radiation increases or decreases in superlinear relationship to the electric input signals which are applied to the controlling radiation source, while the current through the controlled radiation source remains substantially constant. Consequently, a preferred embodiment of a semiconductor arrangement according to the invention is characterized in that the semiconductor body of the controlled injection recombination radiation source contains radiationless recombination centers resulting in that the radiation intensity of this radiation source, at least over part of the current range of this radiation source, increases in superlinear relationship to the current through the radiation source.

Satisfactory results have been obtained with a semiconductor body of gallium phosphide which, at least in the proximity of the PN-junction, is doped with zinc and oxygen (in order to obtain radiating recombination centers) and also with radiationless recombination centers. The modulation of the radiation emitted by the controlled radiation source by means of the controlling radiation source may be very rapid, since the modulation is effected by interaction between radiation quanta and electrons while inertia phenomena, for example, of the kind occuring in photoconductors do not necessarily occur in this case.

The invention further provides an entirely novel type of optoelectronic circuit elements comprising a controlled injection recombination radiation source which is optically coupled to a photosensitive semiconductor body. Thus, a particularly important embodiment of a semiconductor arrangement according to the invention is characterized in that the semiconductor arrangement constitutes an optoelectronic circuit element which has an electric input connected to the controlled radiation source and an electric output connected to the controlling radiation source, while a photosensitive semiconductor body is provided to which the controlled radiation source is optically coupled and to which the electric output of the circuit element is connected.

It will be appreciated that the presence of two electric inputs increases the number of possible circuit arrangements in which an optoelectronic circuit element may be used as compared with known optoelectronic circuit elements having only a single electric input. Since the optoelectronic circuit element according to the invention possesses the aforementioned combination of a controlling radiation source and a controlled radiation source, the aforementioned advantages of this combination are also obtained.

In many cases the radiation emitted by the controlling radiation source consists of radiation quanta which, from the point of view of energy, are smaller than the radiation quanta emitted by the controlled radiation source. Since in the photosensitive semiconductor body a photoelectric effect, for example, in the form of photoconduction or, if the photosensitive semiconductor body includes a PN-junction, in the form of a photovoltage and/or photocurrent, is produced by the controlled radiation source which emits radiation quanta which are energetically greater than the radiation quanta emitted by the controlling radiation source, the width of the forbidden band of the photosensitive semiconductor body may be considerably greater than corresponds to the energy of the radiation quanta of the controlling radiation source. On the one hand this means that the input signals applied to the controlling radiation source in principle may be converted into energetically small radiation quanta in an energetically advantageous manner, while on the other hand a photosensitive semiconductor body may yet be used which has a greater width of the forbidden band, that is to say, a width of the forbidden band greater than the energy of the energetically small radiation quanta, so that large output powers may yet be derived. The power which may be derived from a photosensitive semiconductor body increases with the width of the forbidden band. This has a benificial effect on the overall energy gain of the optoelectronic circuit element according to the invention.

The photosensitive conductor body preferably includes a PN-junction and is irradiated, by the controlled radiation source in the proximity of this PN-junction.

The two radiation sources and the photosensitive semiconductor body may form a constructural combination so that they can readily be handled as a unit. For example, the radiation sources and the photosensitive semiconductor body may be arranged in a preferably opaque, common envelope.

At least two of the components of a semiconductor arrangement according to the invention, which components are constituted by two radiation sources and, as the case may be, by the photosensitive semiconductor body, preferably have a common semiconductor body, which permits a highly compact construction. The likelihood of inconvenient reflections in separate semiconductor bodies may be restricted by providing the semiconductor bodies of the components with antireflection layers commonly used in optics.

In order that the invention may readily be carried into effect embodiments thereof will now be described, by way of example, with reference to the accompanying diagrammatic drawings, in which.

In the FIGS. corresponding parts are designated by like reference numerals.

Figure 1:
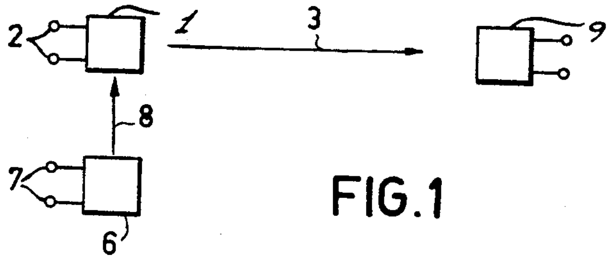
FIG. 1 is a schematic block diagram of a semiconductor arrangement according to the invention.

The semiconductor arrangement according to the invention shown in block schematic form in FIG. 1 comprises a controlled injection recombination radiation source 1 which includes a semiconductor body. The controlled radiation source 1 is provided with electric connecting leads 2 to enable a supply current to be passed through the radiation source. The radiation emitted by the controlled radiation source 1 is designated by the reference numeral 3. The radiative recombination of electrons and holes occurs in the semiconductor body of the controlled radiation source 1 due to the injection of charge carriers. This radiative recombination is controlled by controlling the electron population of an intermediate level, which is situated in the forbidden band between the valence band and the conduction band, with the aid of a controlling radiation source 6, which is optically coupled to the controlled radiation source 1 and emits radiation 8 by which electrons can be brought to a higher energy state in the semiconductor body. The controlling radiation source 6 is provided with connecting leads 7 to enable electric input signals to be supplied to the radiation source 6.

Figure 2:
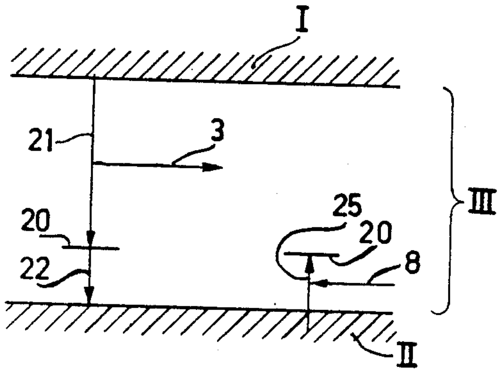
FIGS. 2 and 6 show schematically examples of energy diagrams of semiconductor bodies used in a semiconductor arrangement according to the invention.

An injection recombination radiation source in many cases comprises a semiconductor body having an energy diagram of the kind shown in FIG. 2, in which an intermediate energy level 20 is situated in the forbidden band III between the valence band II and the conduction band I, the recombination with the emission of radiation taking place by way of this intermediate level 20. Thus, electrons from the conduction band I may reach the valence band II in two transition steps 21 and 22 and recombine with a hole in the valence band. Generally only the greater transition step 21 is radiating and causes the emission of radiation 3. The smaller transition step 22 takes place, for example, with the delivery of thermal energy to the crystal lattice.

Electrons can be brought from the valence band to the intermediate level 20 with the aid of radiation 8 the quantum energy of which is sufficient to give rise to a transition step 25 in which an electron is brought from the valence band II to the intermediate level 20, that is to say, the quantum energy of which is at least equal to the spacing between the valence band II and the intermediate level 20. Thus the electron population of the intermediate level 20 can be controlled. This is associated with the control of the recombination with the emission of radiation 3, for if the intermediate level 20 is already occupied, entirely or in part, by electrons, electrons from the conduction band I can hardly or not at all reach the valence band II by way of this intermediate level 20 and recombine with holes with the emission of radiation 3. In this case, the necessary recombination is effected for the greater part in a radiationless manner, for example, via recombination centers in the form of scarcely avoidable crystal defects or impurities. If required, additional radiationless recombination centers may be incorporated, which preferably are substantially symmetrical, that is to say, the capture cross sections are substantially the same for electrons and holes so that these recombination centers are not saturable. Also, with decrease in the radiating recombination increase in the radiationless recombination may occur at the connecting contacts with which the semiconductor body is provided.

This possibility of controlling the recombination with the emission of radiation is utilized in an important embodiment of a semiconductor arrangement according to the invention, in which the controlled injection recombination radiation source 1 comprises a semiconductor body having an intermediate level 20 the electron population of which is controllable by the fact that the radiation 8 emitted by the controlling radiation source 6 is capable of bringing electrons from the valence band into the intermediate level 20, while the recombination with the emission of radiation 3 takes place by way of this intermediate level 20 and can be inhibited by increasing the said electron population.

The injection recombination radiation source 1 may comprise, for example, a semiconductor body 30 (FIG. 3) which has a PN-junction 31 and is doped with zinc and oxygen at least in the proximity of this PN-junction 31. Gallium phosphide has a width of the forbidden band of about 2.25 electron volts, and zinc and oxygen give rise to an intermediate energy level 20 spaced from the valence band by about 0.45 electron volt. In this case the recombination radiation 3 has a quantum energy of about 1.8 electron volts and a wavelength of about 7000 A.U., and the controlling radiation 8 must have a quantum energy situated between about 0.45 electron volt and 1.8 electron volts. If the quantum energy of the controlling radiation 8 is at least equal to 1.8 electron volts, this radiation is capable of causing the larger transition step 21, which is not the intention.

The gallium phosphide body 30 may, for example, have the dimensions about 3 mm. × 3 mm. × 0.5 mm., is doped with zinc and oxygen and exhibits P-type conduction. The PN-junction 31 may be obtained by alloying a tin contact 32 at a temperature between about 400° C. and 700° C. for a time of less than 1 sec. In this process an N-type recrystallized region 33 and the PN-junction 31 are produced. Simultaneously with the tin contact 32 a substantially ohmic contact 35 may be provided by alloying an amount of gold containing about 4 percent by weight of zinc to the gallium phosphide body. The diameter of each of the contacts 32 and 35 may, for example, be about 1 mm. Connecting leads 36 may be provided by a method known in the semiconductor part. By passing a supply current in the forward direction via the leads 36 through the semiconductor body 30 recombination radiation 3 is produced in the proximity of the PN-junction 31. The radiation 8 of the controlling radiation source 6 strikes the semiconductor body 30, for example, on the lateral surface 37.

The controlling radiation source 6 (FIG. 1) may be any radiation source which is capable of delivering the desired controlling radiation 6 having a quantum energy situated between about 0.45 electron volt and 1.8 electron volts, for example, a tungsten ribbon lamp provided with a monochromator, such as an interference filter. Such filters are readily obtainable commercially. By applying electric input signals to the controlling radiation source 6 through the connecting leads 7 a modulated radiation beam 8 is obtained by which the controlled radiation source 1 is controlled.

The controlled radiation source 1 may be remotely controlled by the controlling radiation source 6, the electric input signals being applied to the controlling radiation source 6 through the leads 7 separately from the supply current applied to the controlled radiation source 1 through the leads 2. Thus, electric coupling between a supply current source connected to the leads 2 and an electric signal source connected to the leads 7 may be avoided. The modulation of the controlled radiation source 1 by means of the controlling radiation source 6 may be very rapid, since the modulation is substantially effected by interaction between radiation quanta and electrons, while inertia phenomena which may occur in photoconductors need not occur in this arrangement.

The controlling radiation source 6 may advantageously be an injection recombination radiation source, which permits a simple and compact constructional combination of the controlling radiation source 6 and the controlled radiation source 1.

In the embodiment described, in which the controlled radiation source 1 has a semiconductor body of gallium phosphide, the controlling radiation source 6 may be an injection recombination radiation source of gallium arsenide. Gallium arsenide has a width of forbidden band of about 1.36 electron volts, and a controlling radiation source comprising a gallium arsenide body is capable of emitting radiation having a quantum energy of about 1.36 electron volts and a wavelength of about 9100 A.U. Thus, this radiation has a quantum energy situated in the desired range between about 0.45 electron volt and about 1.8 electron volts. Alternatively, an injection recombination radiation source of indium phosphide may be used, which also can provide radiation having a wavelength of about 9100 A.U.

Figures 3, 4, 5:
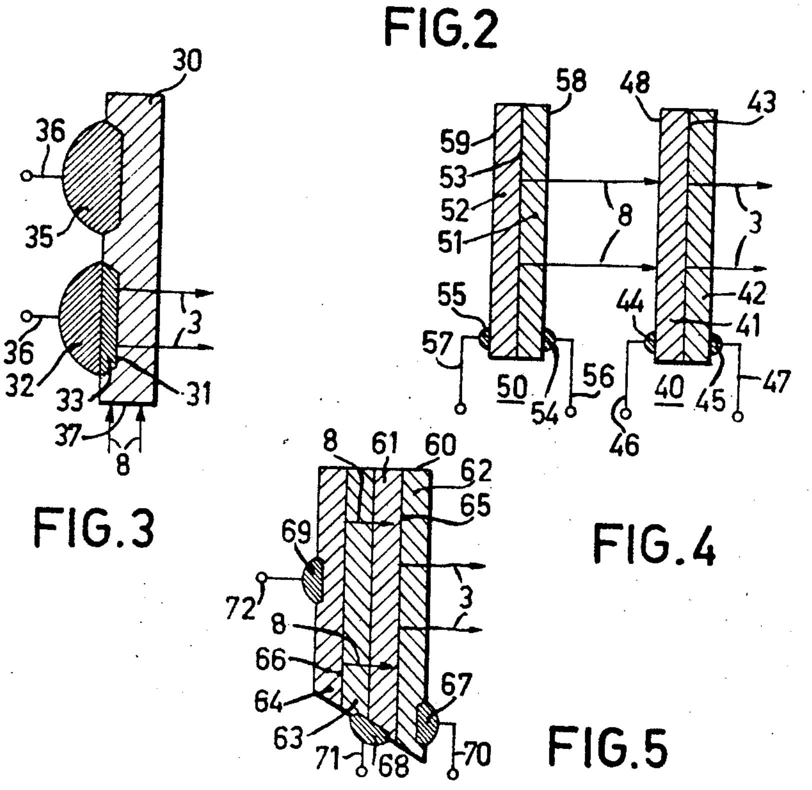
FIGS. 3, 4, 5 and 10 are schematic cross-sectional views of injection recombination radiation sources of a semiconductor arrangement according to the invention.

FIG. 4 shows a simple arrangement comprising a controlled injection recombination radiation source 40 and a controlling injection recombination radiation source 50. The radiation source 40 comprises an oxygen-containing N-type gallium phosphide body 41, in which a P-type zone 42 is produced by diffusion of zinc at about 800°C. so that a PN-junction 43 is produced. By a method known in the semiconductor art contacts 44 and 45 for leads 46 and 47 are provided (The contacts 44 and 45 may be obtained in a manner similar to that in which the contacts 32 and 35 of FIG. 3 are obtained). By passing current by way of leads 46 and 47 in the forward direction through the PN-junction 43 the recombination radiation 3 having a wavelength of about 7000 A.U. is obtained in the proximity of PN-junction 43.

The controlling radiation source 50 comprises an N-type semiconductor body 51 of gallium arsenide in which by diffusion of zinc at about 900°C. a P-type zone 52 and a PN-junction 53 are obtained. Contacts 54 and 55 may consist, for example, of tin and indium containing about 3 percent by weight of zinc, respectively, and are alloyed at a temperature between about 600° C. and 700° C. Leads 56 and 57 are provided in a manner known in the semiconductor art. By passing current by way of the leads 56 and 57 in the forward direction through the PN-junction 53 recombination radiation 8 having a wavelength of about 9100 A.U. is produced in the proximity of the PN-junction 53.

Between surfaces 48 and 58 of the radiation sources 40 and 50 a dielectric mirror may be interposed which transmits the radiation 8 but reflects any radiation 3 travelling towards the radiation source 50. Such dielectric mirrors which transmit one kind of radiation and reflect another kind of radiation, are known in optics.

A surface 59 of the radiation source 50 may be provided with a highly reflecting layer, such as a metal layer, which may be integral with the contact 55.

The radiation sources 40 and 50 may have a common semiconductor body. For example, an N-type gallium arsenide body may epitaxially be provided on an N-type gallium phosphide body by a method known in the semiconductor art. A PN-junction is obtainable both in the gallium phosphide body and in the gallium arsenide body by diffusion of zinc. In this manner, a construction of the kind shown in FIG. 5 is obtained which comprises a semiconductor body 60 having an N-type zone 61 and a P-type zone 62, which zones both consist of gallium phosphide, and an N-type zone 63 and a P-type zone 64, which zones both consist of gallium arsenide. The two PN-junctions are designated 65 and 66, respectively. Contacts 67, 68 and 69 may be provided in a manner similar to that described with reference to FIG. 4.

If a current in the forward direction is passed through the PN-junction 65 by way of leads 70 and 71, the recombination radiation 3 is produced in the proximity of this PN-junction 65. If a current in the forward direction is passed through the PN-junction 66 by way of the leads 72 and 71, the recombination radiation 8 is produced in the proximity of this PN-junction 66.

As FIG. 5 shows the semiconductor body may be tapered by grinding to provide a larger surface area for the provision of contacts to the N-type zones 61 and 63.

Figure 6:
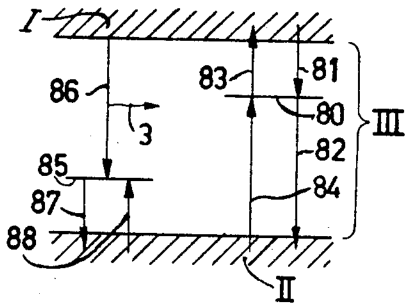

In a further important embodiment of a semiconductor arrangement according to the invention the controlled radiation source 1 (FIG. 1) comprises a semiconductor body having an intermediate level 80 (FIG. 6) in the forbidden band III which permits radiationless recombination of electrons with holes resulting in that, at least over part of the current range of the controlled radiation source 1, the radiative recombination is restricted, while the radiationless recombination and hence the radiative recombination can be controlled by controlling the electron population of the intermediate level 80.

Figure 7:
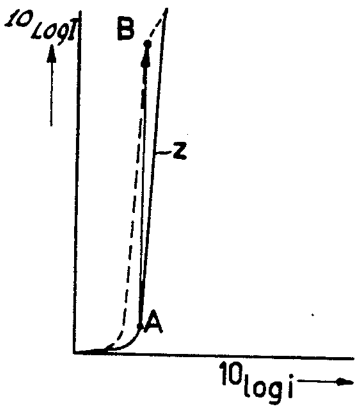
FIG. 7 is a graph of the intensity of the emitted radiation of a controlled injection recombination radiation source which may be used in a semiconductor arrangement according to the invention as a function of the current through this radiation source.

As has been explained hereinbefore, in the case of such intermediate levels 80 produced by radiationless recombination centers of which the capture cross section is greater than that of the radiative recombination centers, the intensity of the emitted radiation 3, over part of the current range of the radiation source 1, may increase in superlinear relationship to the current through the radiation source. If the intensity I (in arbitrary units) of the emitted radiation 3 is plotted logarithmically (base 10) as a function of the logarithm of the current I (in arbitrary units) through the radiation source 1, a curve of the kind shown in FIG. 7 is obtained. The superlinear part of the characteristics curves occurs when the radiationless recombination centers become saturated. Saturation of the radiationless recombination centers may occur, for example, if the capture cross section for injected charge carriers is greater than that for the charge carriers of opposite type, or conversely.

The value of the current I through the radiation source at which saturation sets in depends upon the concentration of radiationless recombination centers. If the concentration of radiationless recombination centers is reduced, saturation of these centers occurs at lower current strengths. This means that the superlinear part of the characteristic of FIG. 7 is displaced towards smaller current strengths, as is shown by the broken line.

The number of radiationless recombination centers, by way of which radiationless recombination of an electron from the conduction band I (FIG. 6) and a hole from the valence band II may take place, can be effectively reduced, that is to say, at least part of the radiationless recombination centers can be rendered inoperative, by irradiation of the semiconductor body with radiation quantum energy of which is sufficient to bring an electron from the intermediate level 80 to the conduction band I. When an electron attains the intermediate level 80 by a transition step 81, this radiation is capable of returning the electron to the conduction band I so that this electron does not attain the valence band II by a transition step 82 and does not recombine with a hole in a radiationless manner. Thus at least part of the radiationless recombination centers can effectively be rendered inoperative by irradiation, in which process in principle the population of the intermediate level 80 is reduced.

If the radiation source 1 is set, for example, to a point A (FIG. 7) and the current passing through the radiation source is maintained constant, the superlinear part of the characteristic curve may be caused by irradiation to coincide with the broken line so that the radiation source is suddenly set to a point B which is associated with a far greater radiation intensity. This change in intensity may even depend superlinearly upon the optical input signal.

The recombination with the emission of radiation may take place by band-to-band transitions or by way of an intermediate level 85 (FIG. 6) by transition steps 86 and 87. In the latter case the larger transition step 86 may be effected, for example, with the emission of recombination radiation 3.

In this modification also, the semiconductor body may advantageously consist of gallium phosphide containing a PN-junction in the proximity of which the semiconductor body is doped with zinc and oxygen in order to obtain the "radiating" intermediate level 85, and also containing radiationless recombination centers in order to obtain the intermediate level 80. These radiationless recombination centers may consist, for example, of crystal defects, while it is also known to use transition elements such as iron and cobalt to obtain radiationless recombination centers.

The radiation source 1 (FIG. 1) may take the same form as is shown in FIG. 3 and may be produced in the same manner with the sole difference that manufacture starts with a gallium phosphide body containing the radiationless recombination centers.

The controlling radiation source 6, which emits radiation 8 capable of causing the transition step 83 (FIG. 6), may again be a tungsten ribbon lamp provided with a monochromator such as an interference filter. Also, the radiating radiation source 6 may again consist of an injection recombination radiation source which is capable of emitting the desired controlling recombination radiation 8 and which may be constructionally combined with the controlled radiation source 1 in a manner similar to that described with reference to FIGS. 4 and 5.

It should be noted that the radiationless recombination by way of the intermediate level 80 (FIG. 6) may also be restricted by irradiation of the semiconductor body with radiation which is capable of bringing electrons from the valence band II to the intermediate level 80 by a transition step 84, for when the electron population of the intermediate level 80 is increased electrons cannot, or can only with difficulty, attain the intermediate level from the conduction band and recombine with a hole from the valence band via this intermediate level.

Obviously, the quantum energy of the controlling radiation 8 must be matched to the values of the transition steps 83 and 85 in a manner such as not to give rise inconveniently to other transition steps, such as, for example, a transition step 88.

The modulated radiation 3 emitted by the controlling radiation source 1 may be detected in known manner by a photosensitive cell 9 (FIG. 1) such as, for example, a cadmium sulfide cell. Alternatively, a photovoltaic cell may be used as the detector.

The invention relates not only to a controlled injection recombination radiation source but also to a completely new type of optoelectronic circuit elements.

Figure 8:
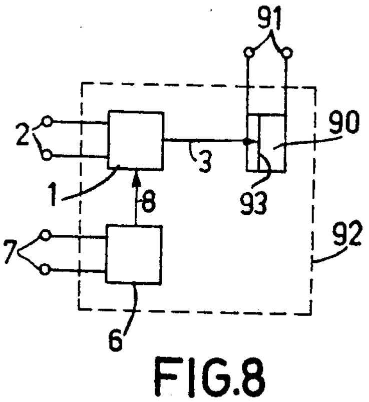
FIG. 8 is a schematic block diagram of an optoelectronic circuit element according to the invention.

According to the invention such as optoelectronic circuit element comprises a controlled injection recombination radiation source 1 (FIG. 8) connected to an electric input 2 and a controlling radiation source 6 connected to an electric input 7. It further comprises a photosensitive semiconductor body 90 to which the controlled radiation source 1 is optically coupled and to which an electric output 91 of the circuit element is connected. The photosensitive semiconductor body preferably contains a PN-junction 93, in the proximity of which the photosensitive semiconductor body is irradiated. The radiation sources 1 and 6 and the photosensitive semiconductor body 90 preferably form a constructural combination. They may, for example, be provided with a common opaque envelope which is shown schematically by a broken line 92. An optoelectronic circuit element according to the invention thus has two electric inputs, which increases the number of its possible uses.

The radiation sources 1 and 6 may take the form which has been described with reference to the preceding elements and to FIGS. 3, 4 and 5. The photosensitive semiconductor body 90 may be any photosensitive semiconductor body which is sensitive to the radiation 3 and preferably includes a PN-junction 93. The radiation sensitive semiconductor body 90 may, similarly to the semiconductor body of the controlled radiation source 1, consist of gallium phosphide doped with zinc and oxygen.

Figure 9:
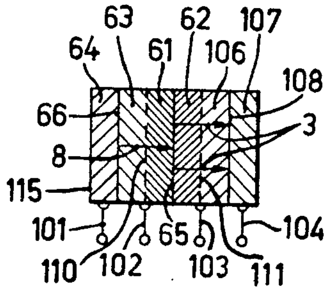
FIG. 9 is a schematic cross-sectional view of an embodiment of an optoelectronic circuit element according to the invention.

If the radiation sources 1 and 6 have a common semiconductor body, as has been discussed with reference to FIG. 5, the photosensitive semiconductor body may also form part of said common semiconductor body with the result that in principle a configuration is obtained of the kind shown schematically in FIG. 9. Zones 63 and 64 with the associated PN-junction 66 and zones 61 and 62 with the associated PN-junction 65 correspond to the zones and PN-junctions designated by the same reference numerals in FIG. 5. Zones 106 and 107 with the associated PN-junction 108 constitute the photosensitive semiconductor body. The zone 64 is provided with a connecting lead 101, the zones 63 and 61 with a common connecting lead 102, the zones 62 and 106 with a common connecting lead 103 and the zone 107 with a connecting lead 104.

The zones 64 and 63 with the PN-junction 66, which through the electric input (101, 102) may be biassed in the forward direction, form the controlling recombination radiation source which emits the radiation 8. The zones 61 and 62 with the PN-junction 65, which through the electric input (102, 103) may be biassed in the forward direction, form the controlled radiation source which emits the radiation 3. A PN-junction 108 of the photosensitive semiconductor body consisting of the zones 106 and 107 may be reversely biassed via the electric output (103, 104) while the photocurrent produced may be taken from the electric output (103, 104) also.

As has been described hereinbefore, the quantum energy of the "controlled" "controlling" radiation 8 may be smaller than that of the "controlled" radiation 3 which produces a photoeffect in the photosensitive semiconductor body (106, 108, 107). As a result the width of the forbidden band of the semiconductor body (64, 66, 63) may be smaller than that of the photosensitive semiconductor body (106, 108, 107) and input signals may be converted into energetically small radiation quanta in an energetically advantageous manner while nevertheless large powers may be taken from the photosensitive semiconductor body.

As may be seen from the preceding, the radiation sources (64, 66, 63) and (61, 65, 62) and the photosensitive semiconductor body (106, 108, 107) may consist of different semiconductor materials. In FIG. 9 the boundaries between the materials are shown by broken lines. The construction of FIG. 9 may be manufactured with the aid of epitaxial and/or diffusion processes commonly used in the semiconductor art.

The radiation 8 must be prevented from inconveniently influencing the photosensitive semiconductor body (106, 108, 107) and this may be ensured by a suitable choice of materials (for example, the same difference in width of the forbidden band), dopings and/or dimensions of the various zones. Also, a dielectric mirror which transmits the radiation 8 may be provided along the boundary 110 and a dielectric mirror which reflects the radiation 8 and transmits the radiation 3 may be provided along the boundary 111. Dielectric mirrors are known from optics.

The surface 115 may be coated with a reflecting layer, for example a metal layer.

It should be noted that in principle several, for example two, radiation sources may be used.

Figure 10:
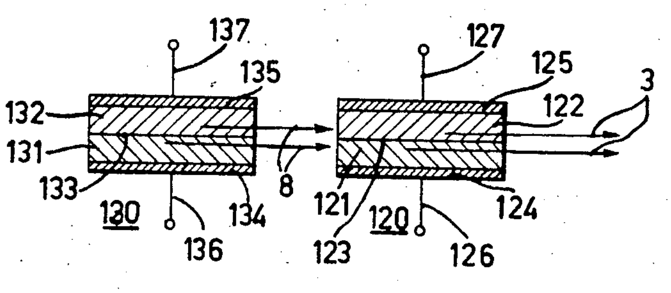

It will be appreciated that the invention is not limited to the embodiments described and that a person skilled in the art may make many modifications without departing from the scope of the invention. Thus, for example, the recombination radiation sources may take the form and be disposed in the arrangement shown in FIG. 10. The controlling radiation source 130 comprises a semiconductor body having two zones 131 and 132 of opposite conductivity types which form a PN-junction 133. The zones are provided with metal contact layers 134 and 135 to which leads 136 and 137, respectively, are connected. The recombination radiation 8 leaves the semiconductor body (131, 132) laterally thereof and strikes a controlled radiation source 120.

The controlled radiation source comprises a semiconductor body having zones 121 and 122 which are of opposite conductivity types and form a PN-junction 123. Metal contact layers for the zones 121 and 122 are designated by 124 and 125, respectively, and provided with leads 126 and 127, respectively. The recombination radiation 3 leaves the semiconductor body (121, 122) laterally thereof. Between the semiconductor bodies (131, 132) and (121, 122) a dielectric mirror may again be interposed which transmits the radiation 8 and reflects the radiation 3. Moreover, other semiconductor materials than those mentioned may be used. The semiconductor body of the controlled radiation source may advantageously consist of aluminum phosphide instead of gallium phosphide. Furthermore at least one of the injection recombination radiation sources may function as an injection recombination laser.

We claim:

1. A controllable injection recombination radiation source comprising a semiconductive body of a material having a forbidden gap between its valence and conduction bands and within the forbidden gap a deep-lying impurity level defining between one of the conduction band and the valence band, and the impurity level a radiative transition, a pair of electrodes coupled to the semiconductive body, means for applying voltages to the electrodes to cause the injection of charge carriers and the establishment of free electrons in the conduction band, said electrons tending to radiatively recombine via the said impurity level by means of a radiative transition to the impurity level, and an auxiliary voltage-responsive radiation source optically coupled to the semiconductive body for controllably irradiating same with radiant energy capable of bringing electrons from the valence band to the said impurity level to increase the electron population thereof, said electron population increase of the impurity level reducing the probability of the said radiative transition and thereby reducing in a controlled manner the output radiation from said semiconductive body.

2. A controllable injection recombination radiation source as set forth in claim 1 wherein the radiative transition is from the conduction band to the impurity level, and the energy content of the radiation from the auxiliary source is large enough to bring electrons from the valence band to the impurity level, but is too small to cause the transition from the impurity level to the conduction band.

3. A controllable injection recombination radiation source as set forth in claim 2 wherein the material of said semiconductive body is constituted of gallium phosphide doped with zinc and oxygen and contains a PN-junction.

4. A controllable injection recombination radiation source comprising a semiconductive body of a material having a forbidden gap between its valence and conduction bands providing a radiative transition and within the forbidden gap a deep-lying impurity level defining between both the conduction band and the valence band and the impurity level radiationless transitions, a pair of electrodes coupled to the semiconductive body, means for applying voltages to the electrodes to cause the injection of charge carriers and the establishment of free electrons in the conduction band, said electrons tending to radiatively recombine via a band-to-band transition or via an impurity level or to effect a radiationless recombination via the deep-lying level, and an auxiliary voltage-responsive radiation source optically coupled to the semiconductive body for controllably irradiating same with energy capable of bringing electrons from the valence band to the said deep-lying impurity level to increase the electron population thereof or capable of bringing electrons from the deep-lying impurity level to the conduction band to decrease the population of the deep-lying level, said electron population variation of the deep-lying impurity level reducing the probability of the said radiationless transition and thereby increasing in a controlled manner the output radiation from said semiconductive body.

5. A controllable recombination radiation source as set forth in claim 4 wherein the semiconductor body is constituted of gallium phosphide doped with zinc and oxygen and containing a PN-junction.

PO-1050
(5/69)

UNITED STATES PATENT OFFICE
CERTIFICATE OF CORRECTION

Patent No. 3555283 Dated January 12, 1971

Inventor(s) HERMANN G. GRIMMEISS and PETER J.P.G. SIMONS

It is certified that error appears in the above-identified patent and that said Letters Patent are hereby corrected as shown below:

Column 2, line 18, cancel "is" (second occurrence).

Column 3, line 32, "on" should read -- in --.

Column 4, line 10, "occuring" should read -- occurring --.

Column 9, line 43, "85" should read -- 84 --.

Column 10, line 32, cancel "controlling";

line 52, "same" should read -- said --.

Signed and sealed this 8th day of June 1971.

(SEAL)
Attest:

EDWARD M.FLETCHER,JR.
Attesting Officer

WILLIAM E. SCHUYLER, JR
Commissioner of Patents